United States Patent Office 3,642,931
Patented Feb. 15, 1972

3,642,931
DISPROPORTIONATION OF OLEFINS
Leonard Turner, Woking, and Keith Vaughan Williams, Shepperton, England, assignors to Brockway Glass Company, Inc., Brockway, Pa.
No Drawing. Filed Aug. 22, 1966, Ser. No. 573,881
Claims priority, application Great Britain, Dec. 16, 1965, 53,351/65, Patent 1,093,784
Int. Cl. C07c 3/62
U.S. Cl. 260—683 D    17 Claims

ABSTRACT OF THE DISCLOSURE

This invention is directed to the disproportionation of olefinic hydrocarbons with an activated rhenium heptoxide-containing catalyst.

This invention relates to a catalyst suitable for use in the disproportionation of acyclic olefinic hydrocarbons and to a process for the disproportionation of acyclic olefinic hydrocarbons.

By the term "disproportionation" throughout this specification is meant the conversion of the feed hydrocarbon to a mixture of hydrocarbons having lower and higher carbon numbers than the feed hydrocarbons.

According to one aspect of the present invention there is provided a catalyst suitable for use in the disproportionation of acyclic olefins, the catalyst comprising two components, rhenium heptoxide and a support, the support comprising a refractory oxide of an element of Group IV of the Periodic Table according to Mendeleff or a mixed or a compound oxide containing such as oxide.

Preferably the catalyst consists solely of rhenium heptoxide and the support.

Suitable refractory oxides include zirconia, thoria, and stannic oxide.

The catalyst preferably contains 0.1–40, most preferably 1–20, parts rhenium heptoxide per 100 parts support.

The preferred rhenium heptoxide catalysts may be prepared conveniently by mixing a solution of ammonium perrhenate, $NH_4ReO_4$, with the support or the support precursor, i.e. a hydroxide from which the oxide may be derived, and heating to convert the perrhenate and, if present, the hydroxide to the oxide.

The catalysts are activated before use by subjecting them to a thermal treatment, either in a stream of an inert gas such as nitrogen, carbon dioxide or helium, or preferably in a stream of air or oxygen followed by final treatment in an inert gas. Suitably the catalysts are treated in air at a temperature in the range 300°–900° C. for 1 minute to 20 hours and then under similar conditions in an inert gas such as nitrogen.

According to another aspect of the present invention there is provided a process for the disproportionation of an acyclic olefinic hydrocarbon which process comprises contacting an acyclic olefinic hydrocarbon with a disproportionation catalyst as hereinbefore described under conditions of temperature and pressure which effect disproportionation of the feed.

Acyclic olefins suitable as feeds include $C_{3-30}$, preferably $C_{3-8}$ straight chain alkenes. The alkenes may be alpha, beta, or gamma, etc., alkenes. Suitable alkenes include propylene, butene-1, butene-2, pentene-1, pentene-2, hexene-1, hexene-2, hexene-3, heptene-1, heptene-2, heptene-3, octene-1, octene-2, etc. Branched chain $C_{3-30}$ alkenes are also suitable feeds.

Our U.S. Pat. No. 3,526,676 discloses a process for the preparation of olefins which process comprises reacting an initial mixture of two dissimilar acyclic olefins over a disproportionation catalyst. A catalyst prepared by a process according to the present invention is very suitable for use in such a process.

Reaction conditions may vary with the composition of the feed, the desired product, and the nature of the catalyst.

Reaction temperatures may range from −20° C. to +500° C., temperatures in the range 20° C.–250° C. being preferred.

Reaction pressures may be in the range 0–2000 p.s.i.g.

Reaction times may vary between 0.01 second and 120 minutes, preferably between 0.1 second and 10 minutes.

Suitable olefin/catalyst weight ratios are in the range 1000:1 to 1:1.

Preferably the GHSV of the feedstock olefin is in the range 500–5000 vol./vol.

If desired, the process may be effected in the presence of an inert diluent, for example, a paraffinic or cycloparaffinic hydrocarbon.

The process may be carried out batchwise or in a continuous manner, using the catalyst in the form of a fixed bed, a fluidised bed or a moving bed. If desired the disproportionation product may be separated into fractions and selected fractions, e.g., unconverted feed or fractions not having the desired carbon number, may be recycled to the reactor.

The invention is illustrated by the following examples.

EXAMPLE 1

An aqueous solution of ammonium perrhenate (1.92 g.) was added to zirconium dioxide (12.9 g.) and the mixture was evaporated to dryness with stirring on a water bath. The resulting solid was dried at 110° C. for 2 hours and activated in dry air for 1 hour at 580° C. followed by dry nitrogen for 1 hour at 580° C., the gases being passed at a GHSV of 2000. The final catalyst contained 13.0% $Re_2O_7$ by weight.

Propylene was passed over the catalyst at a GHSV of 1600. Samples of the product were taken after 5 minutes at 50° C., after 10 minutes at 150° C. and after 15 minutes at 250° C. The activity of the catalyst at these three temperatures is shown in the following table. In all cases the propylene disproportionation products were approximately equimolar amounts of ethylene and n-butenes.

EXAMPLES 2 AND 3

Catalysts were prepared to contain 13.0 and 14.5% $Re_2O_7$ on thoria and stannic oxide, the procedure being as described in Example 1, with the exception that in the case of thorium that the aqueous solution of ammonium perrhenate was added to thoric hydroxide.

Propylene was passed over the catalysts as previously described with reference to Example 1, and the activities of the catalysts at the same three temperatures are shown in the following table.

TABLE

| Example | Starting material | Final oxide | Percent disproportionation | | |
|---|---|---|---|---|---|
| | | | 50° C. | 150° C. | 250° C. |
| 1 | $ZrO_2$ | $ZrO_2$ | 1.9 | 2.1 | 0.2 |
| 2 | $Th(OH)_4$ | $ThO_2$ | 6.8 | 12.0 | 2.1 |
| 3 | $SnO_2$ | $SnO_2$ | 15.0 | 2.0 | 0.0 |

EXAMPLE 4

To 20 g. of freshly-prepared titanium dioxide, prepared by the hydrolysis of tetra-n-butyl titanate, was added a slurry of 5.0 g. ammonium perrhenate in water (40 ml.). The product was evaporated to dryness on a water-bath then heated at 110° C. for 18 h. The product containing 14% by weight of $Re_2O_7$ was activated by heating at 300° C. in a stream of dry air for 1 h. and dry nitrogen for 1 h.

Propylene at a GHSV of 1600 was passed over the activated catalyst at 40–150° C. with the following results:

|                                          | Temperature, ° C. | | |
|---|---|---|---|
|                                          | 40    | 75    | 150  |
| Percent disproportionation of $C_3H_6$   | 3.5   | 6.2   | 13.0 |
| Total products, weight percent:          |       |       |      |
| $C_2H_4$                                 | 2.0   | 3.5   | 4.8  |
| $C_3H_6$                                 | 96.5  | 93.8  | 87.0 |
| $C_4H_8$-1                               | 0     | 0     | 0.5  |
| $C_4H_8$-2                               | 1.5   | 2.7   | 7.7  |

EXAMPLE 5

To a freshly-prepared silica gel (made by the hydrolysis of tetra-ethyl-orthosilicate) (15.6 g.) was added a saturated aqueous solution of ammonium perrhenate containing 3.30 g. of the salt. The mixture was evaporated to dryness on a water-bath and dried at 110° C. for 18 h. The product containing 14% by wt. $Re_2O_7$ was activated by heating for 1 hr. in dry air and 1.5 h. in dry nitrogen at 400–450° C. (runs A) and 550–600° C. (runs B).

Propylene was then passed over the catalysts with the following results:

Runs A

Catalyst activated at 400–450° C.
GHSV of propylene 2000

|                                          | Reaction temperature, ° C. | | |
|---|---|---|---|
|                                          | 300   | 430   | 520  |
| Percent disproportionation of $C_3H_6$   | 2.0   | 7.5   | 6.0  |
| Products, weight percent of $C_3H_6$ converted: |  |  |  |
| $C_2H_4$                                 | 34    | 34.9  | 37.5 |
| $C_4H_8$-1                               | 10    | 7.1   | 8.5  |
| $C_4H_8$-2                               | 54    | 55.3  | 47.4 |
| Iso-$C_4H_8$                             | 2     | 2.7   | 3.9  |
| $C_5H_{10}$                              | 0     | Trace | 2.7  |

Runs B

Catalyst activated at 550–600° C.
GHSX of propylene 2000

|                                          | Reaction temperature, ° C. | |
|---|---|---|
|                                          | 300   | 500   |
| Percent disproportionation of $C_3H_6$   | 3.0   | 4.6   |
| Products, weight percent of $C_3H_6$ converted: |  |  |
| $C_2H_4$                                 | 35.1  | 38.5  |
| $C_4H_8$-1                               | 7.6   | 5.0   |
| $C_4H_8$-2                               | 56.6  | 51.2  |
| Iso-$C_4H_8$                             | 0.7   | 3.5   |
| $C_5H_{10}$                              | Trace | 1.8   |

What we claim is:

1. A process for the disproportionation of an acyclic olefin which process comprises contacting an acyclic olefin with a disproportionation catalyst comprising two components, rhenium heptoxide and a support, the support comprising a refractory oxide of zirconium, thorium or tin or a mixed or a compound oxide containing such an oxide, said disproportionation catalyst being activated by subjecting the catalyst to a thermal treatment in an inert and/or oxidising gas, said disproportionation process being carried out under conditions of temperature and pressure which effect disproportionation of the feed.

2. A process according to claim 1 wherein the feed is a $C_{3-30}$ alkene.

3. A process according to claim 1 wherein disproportionation is effected at a temperature in the range −20° to +500° C.

4. A process according to claim 1 wherein disproportionation is effected under a pressure in the range 0–2000 p.s.i.g.

5. A process according to claim 1 wherein the reaction time lies between 0.01 second and 120 minutes.

6. A process according to claim 1 wherein the olefin/catalyst weight ratio is in the range 1000:1 to 1:1.

7. A process according to claim 1 wherein the GHSV of the feedstock olefin is in the range 500–5000 vol./vol.

8. A process according to claim 1 wherein the support is zirconia, thoria or stannic oxide.

9. A process according to claim 1 wherein the catalyst contains from 0.1 to 40 parts by weight of rhenium heptoxide per 100 parts of support.

10. A process according to claim 9 wherein the catalyst contains from 1 to 20 parts by weight of rhenium heptoxide per 100 parts of support.

11. A process according to claim 1 wherein the catalyst is activated by treatment in air at a temperature within the range of from 300° to 900° C. for a period of time within the range of from one minute to twenty hours and then treatment in an inert gas at a temperature within the range of from 300° to 900° C. for a period of time within the range of from one minute to twenty hours.

12. A process according to claim 11 wherein the feed is a $C_{3-8}$ alkene.

13. A process according to claim 11 wherein disproportionation is effected at a temperature in the range 20° to 250° C.

14. A process according to claim 11 wherein the reaction time lies between 0.1 second and 10 minutes.

15. A process according to claim 11 wherein the catalyst consists solely of rhenium heptoxide and the support.

16. A process for the disproportionation of $C_3$ to $C_8$ straight chain alkenes comprising contacting the alkene feed with an activated disproportionation catalyst at a temperature in the range of from 25° to 250° C. at a pressure in the range of from 0 to 2000 p.s.i.g., at an olefin/catalyst weight ratio in the range of from 1000:1 to 1:1 at a GHSV of the feed olefin in the range of from 500 to 5000 vol./vol. and for a time within the range of from 0.1 second to 10 minutes, sufficient to effect disportionation, the catalyst consisting essentially of rhenium heptoxide and a support selected from the group consisting of zirconia, thoria and stannic oxide, the rhenium heptoxide being present in an amount of from 0.1 to 40 parts by weight per 100 parts of support, said catalyst having been activated by thermal treatment in an inert and/or oxidising gas.

17. A process according to claim 16 in which the catalyst is activated by treatment in air at a temperature in the range of from 300° to 900° C. and then in an inert gas at a temperature in the range of from 300° to 900° C.

References Cited

UNITED STATES PATENTS

| 2,614,137 | 10/1952 | Chenicek | 260—683 |
| 3,261,879 | 7/1966  | Banks    | 260—683 |
| 3,285,845 | 11/1966 | Demeester | 208—27 |

DELBERT E. GANTZ, Primary Examiner

C. E. SPRESSER, Jr., Assistant Examiner

UNITED STATES PATENT OFFICE
CERTIFICATE OF CORRECTION

Patent No. 3,642,931        Dated February 15, 1972

Inventor(s) Leonard Turner and Keith Vaughan Williams

It is certified that error appears in the above-identified patent and that said Letters Patent are hereby corrected as shown below:

Leonard Turner, Woking, and Keith Vaughan Williams,

Shepperton, England, assignors to The British

Petroleum Company Limited, Britannic House,

Moor Lane, London, E.C.2., England.

Signed and sealed this 3rd day of October 1972.

(SEAL)
Attest:

EDWARD M. FLETCHER, JR.
Attesting Officer

ROBERT GOTTSCHALK
Commissioner of Patents